(12) United States Patent
Krishnaswamy et al.

(10) Patent No.: US 11,472,140 B2
(45) Date of Patent: Oct. 18, 2022

(54) COMPOSITE STRUCTURE THROUGH-HOLE REPAIR METHODS

(71) Applicant: THE BOEING COMPANY, Chicago, IL (US)

(72) Inventors: Pradeep Krishnaswamy, Redmond, WA (US); Connor F. Lowrey, Everett, WA (US); Christopher L. Brooks, Jr., Ladson, SC (US); Kirsten K. Bossenbroek Spalding, Seattle, WA (US)

(73) Assignee: THE BOEING COMPANY, Chicago, IL (US)

( * ) Notice: Subject to any disclaimer, the term of this patent is extended or adjusted under 35 U.S.C. 154(b) by 835 days.

(21) Appl. No.: 16/033,267

(22) Filed: Jul. 12, 2018

(65) Prior Publication Data

US 2020/0016855 A1  Jan. 16, 2020

(51) Int. Cl.
*B29C 73/02* (2006.01)
*B29K 63/00* (2006.01)
*B29L 31/30* (2006.01)

(52) U.S. Cl.
CPC .......... *B29C 73/02* (2013.01); *B29K 2063/00* (2013.01); *B29L 2031/3085* (2013.01)

(58) Field of Classification Search
None
See application file for complete search history.

(56) References Cited

U.S. PATENT DOCUMENTS

| 4,696,711 | A | | 9/1987 | Greszczuk | |
|---|---|---|---|---|---|
| 5,833,795 | A | * | 11/1998 | Smith | B29C 73/02 156/272.4 |
| 8,465,241 | B2 | * | 6/2013 | Gaw | B29C 70/083 411/424 |
| 9,242,440 | B2 | * | 1/2016 | Hafenrichter | H01Q 21/0087 |
| 9,365,022 | B2 | * | 6/2016 | Kendrick | B29C 66/63 |
| 10,549,489 | B2 | * | 2/2020 | Ogale | C08J 5/04 |
| 2008/0148561 | A1 | | 6/2008 | Magera et al. | |
| 2009/0110901 | A1 | | 4/2009 | Gaw et al. | |
| 2015/0314577 | A1 | | 11/2015 | Dan-Jumbo | |
| 2017/0312943 | A1 | * | 11/2017 | Ivy | B29C 35/0266 |
| 2017/0312944 | A1 | * | 11/2017 | Ivy | B29C 65/30 |

(Continued)

FOREIGN PATENT DOCUMENTS

| CN | 102874416 | 1/2013 |
|---|---|---|
| FR | 2985680 | 7/2013 |

OTHER PUBLICATIONS

Editor, Patrick Panzera. "Chapter?: Advanced Composite Material—FAA." Issuu, Jan. 13, 2014, issuu.com/contact.magazine/docs/acm/49. (Year: 2014).*

(Continued)

*Primary Examiner* — Kelly M Gambetta
*Assistant Examiner* — Andrés E. Behrens, Jr.
(74) *Attorney, Agent, or Firm* — The Small Patent Law Group LLC; Joseph M. Butscher

(57) ABSTRACT

A method of repairing a through-hole formed in a structure having at least one composite material includes filling at least a portion of the through-hole with a potting compound, inserting a portion of a cartridge heater into the through-hole, and curing the potting compound with the cartridge heater.

20 Claims, 7 Drawing Sheets

(56) References Cited

U.S. PATENT DOCUMENTS

2019/0111632 A1\* 4/2019 Khosravani .......... B29C 70/745

OTHER PUBLICATIONS

Extended European Search Report for EP 19180889.8-1019, dated Dec. 16, 2019.
First Notification of Office Action for Chinese Patent App. No. 201910623689.6, dated Jun. 2, 2022 (and English translation).
First Written Opinion fir Singapore App. No. 10201905903W, dated Jul. 29, 2022.
Machine translation of FR2985680.

\* cited by examiner

COMPOSITE STRUCTURE THROUGH-HOLE REPAIR METHODS

FIELD OF EMBODIMENTS OF THE DISCLOSURE

Embodiments of the present disclosure generally relate to methods for repairing through-holes formed in structures, which may include composite materials.

BACKGROUND OF THE DISCLOSURE

Various portions of certain aircraft are formed of composite materials, such as carbon fiber materials. For example, portions of wings may include composite materials. The composite materials may be sandwiched between metal layers.

In order to secure portions of components together, fasteners may be used. As such, through-holes are formed through components. The through-holes are configured to receive and retain portions of the fasteners, such as threaded shafts of bolts. The through-holes extend through the composite materials. Through-hole related discrepancies account for a high percentage (such as in excess of 60%) of rejectable conditions in production and post-production repairs and modifications.

In order to repair through-holes within a component that includes a composite material, a through-hole is typically filled with a potting compound. After the through-hole is filled with the potting compound, the component is heat cured. In order to cure the potting compound within the through-hole, heat blankets are positioned on the component proximate to both open ends of the through-hole. For example, a first heat blanket may be positioned on a first side of the component, and a second heat blanket may be positioned on an opposite side of the component. The component is then heat cured for a predetermined time to ensure that the potting compound is heated to a particular finished temperature.

In practice, heat curing for layups (that is, structures including layers of different materials) having thicknesses that exceed 0.25 inches typically requires placement of heat blankets on each side of a repair area. Placement of a first heat blanket on an external surface of a repair area is typically easy. That is, the first heat blanket is simply positioned on the external surface. However, placement of the second heat blanket on an opposing internal surface of a repair is typically complicated by the presence of other structures and limited access areas within the component. Therefore, portions of a particular component may need to be disassembled in order to position one or more heating elements thereon and/or therein. In general, a heat curing process using multiple heat blankets may be complicated, time-consuming, and labor intensive.

SUMMARY OF THE DISCLOSURE

A need exists for an efficient method of repairing a composite material, such as within a layup that forms a portion of a component, such as a portion of an aircraft wing.

With that need in mind, certain embodiments of the present disclosure provide a method of repairing a through-hole formed in a structure having at least one composite material. The method includes filling at least a portion of the through-hole with a potting compound, inserting a portion of a cartridge heater into the through-hole, and curing the potting compound with the cartridge heater.

The method may include plugging a first end of the through-hole. The filling occurs after the plugging.

In at least one embodiment, the curing includes concentrating heat energy within an intermediate portion of a shaft of the cartridge heater. The intermediate portion is between a proximal end and a distal end of the shaft. The concentrating may also include generating lesser amounts of heat energy at the proximal end and the distal end than at the intermediate portion.

In at least one embodiment, the method includes initially heating the potting compound to set the potting compound within the through-hole. The method may also include drilling a hole through the potting compound that is set within the through-hole. The inserting may include inserting a shaft of the cartridge heater in the hole through the potting compound.

The method also includes removing the portion of the cartridge heater from the through-hole after the curing. In at least one embodiment, the method includes drilling a full-size hole through the potting compound within the through-hole of the structure after the curing (and/or the removing).

The method may include applying a release agent to the portion of the cartridge heater before the inserting.

In at least one embodiment, the filling occurs before the inserting. In at least one other embodiment, the filling occurs after the inserting. In at least one embodiment, the inserting includes inserting the portion of the cartridge heater into the potting compound within the through-hole before the potting compound sets.

DETAILED DESCRIPTION OF THE DISCLOSURE

Figure 1:
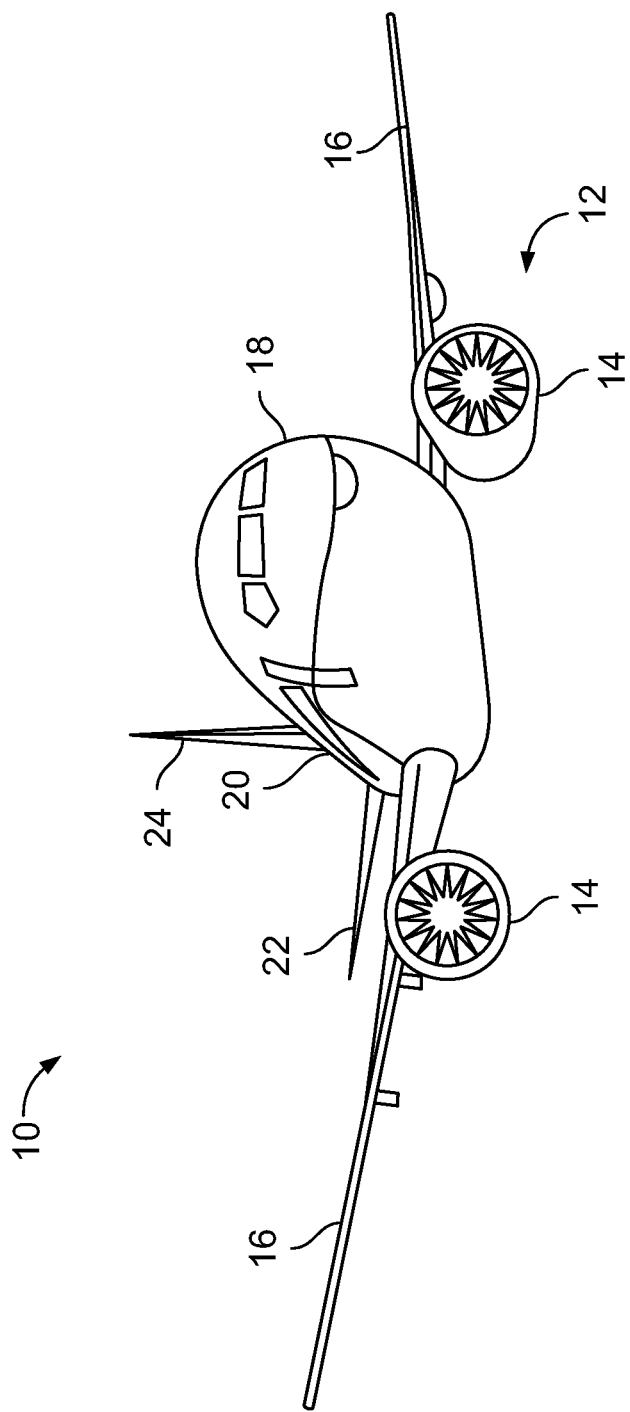
FIG. 1 is a diagrammatic representation of a front perspective view of a vehicle, according to an embodiment of the present disclosure.

The foregoing summary, as well as the following detailed description of certain embodiments will be better understood when read in conjunction with the appended drawings. As used herein, an element or step recited in the singular and preceded by the word "a" or "an" should be understood as not necessarily excluding the plural of the elements or steps. Further, references to "one embodiment" are not intended to be interpreted as excluding the existence of additional embodiments that also incorporate the recited features. Moreover, unless explicitly stated to the contrary, embodiments "comprising" or "having" an element or a plurality of elements having a particular property may include additional elements not having that property.

Certain embodiments of the present disclosure provide a method for repairing of through-hole of a component including a composite material through a sequence of steps. Heating or curing is accomplished by inserting a time-controlled and/or thermostatically-controlled cartridge heater into the through-hole. A diameter, length, and vertical placement of the cartridge heater is aligned with the region of the material stack that is to be heat cured, thereby improving the quality of the repair, simplifying the physical process, and/or reducing the overall repair time and effort.

In at least one embodiment, the method includes filling a through-hole with potting compound. A plug (such as formed of Teflon) may be used to hold the potting compound in place as the potting compound sets. The method may also include drilling a hole through the potting compound, inserting the cartridge heater to cure the potting compound, and removing the cartridge heater after a predetermined curing time. In at least one other embodiment, the method includes filling a through-hole with potting compound and, while still soft, inserting an undersized cartridge heater (covered with a release agent, such as FREKOTE), and curing the potting compound. The temperature and duration of curing is determined by the materials of the structural stack-up, the potting compound, and the depth and diameter of the repair, along with other factors, which may be determined by engineering analysis and physical experiments.

The composite material may be formed of carbon fibers. In at least one embodiment, the composite material may include a core sandwiched between opposed first and second skins. The core may include a plurality of interconnected honeycomb cells. In at least one other embodiment, the core may be a solid layer or porous foam layer. The core may be formed of aramid fibers and/or polyamides, for example. The first and second skins may be or include one or more pre-impregnated epoxy resin layers that include fibers, such as fiberglass, graphite, Kevlar, and/or the like.

In at least one embodiment, the potting compound is Epocast 1635 A/B, such as manufactured by Huntsman Advanced Materials, which is used to repair holes in assembled composite structures. Optionally, other potting compounds may be used. The cartridge heater has unique watt densities for heating and insulation. A series of cartridge heaters may be used for different hole diameters. Embodiments of the present disclosure provide methods of repairing through-holes of composite structures that avoid or reduce disassembly of components (such as stack-ups that include the composite structures), and efficiently streamline hole repair processes. The cartridge heaters are configured to provide in-situ targeted heating to cure potting compound for repair of through-holes in composite structures without the need for disassembling the composite structures. As such, certain embodiments of the present disclosure reduce instances of disassembly.

Certain embodiments of the present disclosure provide a method of repairing a through-hole of a composite structure. The method includes plugging one side of the through-hole with a plug (such as formed of Teflon), filling the through-hole with potting compound, letting the potting compound set until firm, drilling an undersized hole through the potting compound, coating a cartridge heater configured for through-hole repairs with a release agent (such as FREKOTE), inserting the cartridge heater into the drilled cavity, heating (via the cartridge heater) the through-hole cavity for sufficient time to reach a pre-determined cure temperature, removing the cartridge heater, and drilling the cured compound to full-size diameter.

FIG. 1 is a diagrammatic representation of a front perspective view of a vehicle, such as an aircraft 10, according to an embodiment of the present disclosure. The aircraft 10 includes a propulsion system 12 that may include two turbofan engines 14, for example. Optionally, the propulsion system 12 may include more engines 14 than shown. The engines 14 are carried by wings 16 of the aircraft 10. In other embodiments, the engines 14 may be carried by a fuselage 18 and/or an empennage 20. The empennage 20 may also support horizontal stabilizers 22 and a vertical stabilizer 24.

The fuselage 18 of the aircraft 10 defines an interior cabin, which may include a cockpit, one or more work sections (for example, galleys, carry-on baggage areas, and the like), one or more passenger sections (for example, first class, business class, and coach sections), and an aft section.

Various portions of the aircraft 10 may be formed of composite materials. For example, portions of the wings 16 may be formed of composite materials. In some cases, composite materials may be coupled to other materials, such as metals. Embodiments of the present disclosure provide methods of repairing through-holes formed in the composite materials.

Alternatively, instead of an aircraft, embodiments of the present disclosure may be used with various other vehicles, such as automobiles, buses, locomotives and train cars, watercraft, spacecraft, and the like. Also, optionally, embodiments of the present disclosure may be used to repair composite materials having through-holes in various other structures, components, or the like, other than in vehicles.

Figure 2:
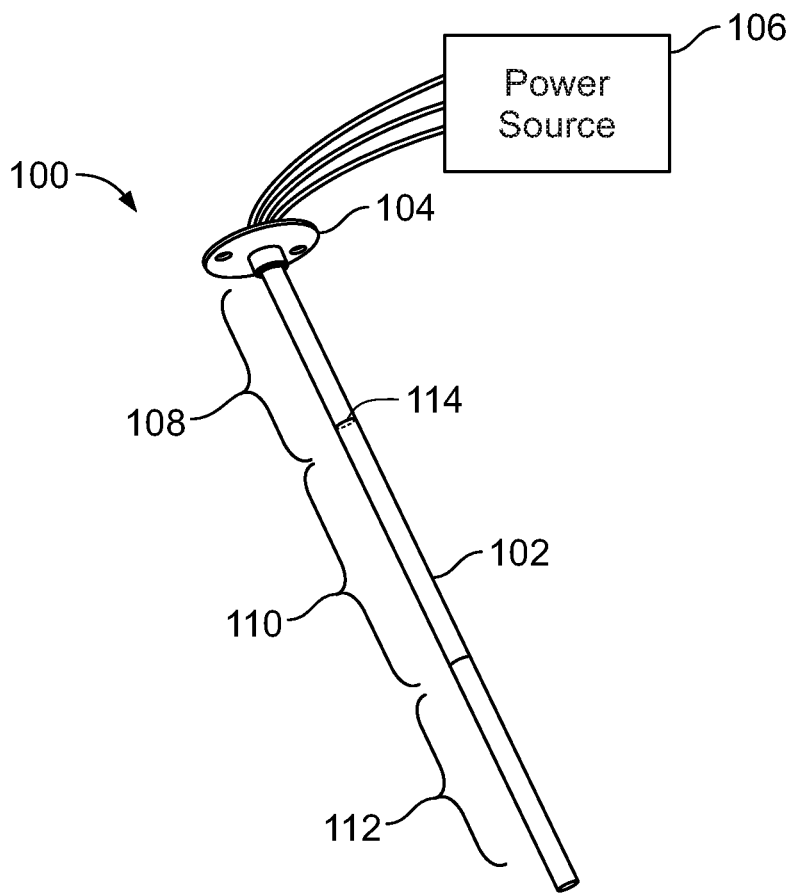
FIG. 2 is a diagrammatic representation of a lateral perspective view of a cartridge heater, according to an embodiment of the present disclosure.

FIG. 2 is a diagrammatic representation of a lateral perspective view of a cartridge heater 100, according to an embodiment of the present disclosure. The cartridge heater 100 includes a tubular shaft 102 that connects to a cap 104. The cartridge heater 100 is configured to connect to a power source 106 (such as through one or more wires) that supplies power to the cartridge heater 100 to generate heat. In this manner, the cartridge heater 100 is configured to provide curing heat to a potting compound within a through-hole of a structure.

The shaft 102 includes a proximal end 108 proximate to the cap 104, and an intermediate portion 110 between the proximal end 108 and a distal end 112. The watt densities of the proximal end 108, the intermediate portion 110, and the distal end 112 may differ. For example, the watt density of the intermediate portion 110 may be greater than the watt densities of the proximal end 108 and the distal end 112. As such, the heat energy generated at the intermediate portion 110 exceeds that generated at the proximal end 108 and the distal end 112. The intermediate portion 110 provides a greater watt density to generate an increased amount of heat as the intermediate portion 110 is configured to be positioned within a through-hole to be repaired that extends through a composite material, whereas the proximal end 108 and the distal end 112 may not extend through the composite material during a curing process. By having lower watt densities, the proximal end 108 and the distal end 112 generate less heat energy than the intermediate portion 110, but at the same time ensure that heat energy generated by the intermediate portion 110 remains concentrated at the intermediate portion 110, and does not substantially radiate out of the cartridge heater 100 through the proximal end 108 or the distal end 112.

In at least one embodiment, the watt density of the proximal end 108 and the distal end 112 may be 10-15 watts per square inch, while the watt density of the intermediate portion 110 may be 40 watts per square inch. Optionally, the watt densities of the proximal end 108, the intermediate portion 110, and the distal end 112 may be greater or lesser than those discussed above. In some embodiment, the watt densities of the proximal end 108, the intermediate portion 110, and the distal end 112 may be approximately the same.

The different watt densities at different areas of the cartridge heater 100 are configured to provide targeted curing heat within a through-hole of a structure. The different watt densities may also be configured to provide specific curing heat for different sized through-holes. The cartridge heater 100 may include integral thermocouples to measure temperatures at various locations of the cartridge heater 100.

The shaft 102 includes a diameter 114. In at least one embodiment, multiple cartridge heaters 100 having different diameters 114 may be used. For example, a first cartridge heater 100 may have a diameter 114 of 0.75 inches, a second cartridge heater 100 may have a diameter 114 of 0.50 inches, and a third cartridge heater 100 may have a diameter 114 of 0.25 inches. The varying diameters of the different cartridge heaters 100 may be used to cure potting compound within through-holes of different sizes, for example. In at least one embodiment, a single cartridge heater may include sections having different diameters. As such, the same cartridge heater may be used in relation to multiple holes having different diameters.

Figure 3:
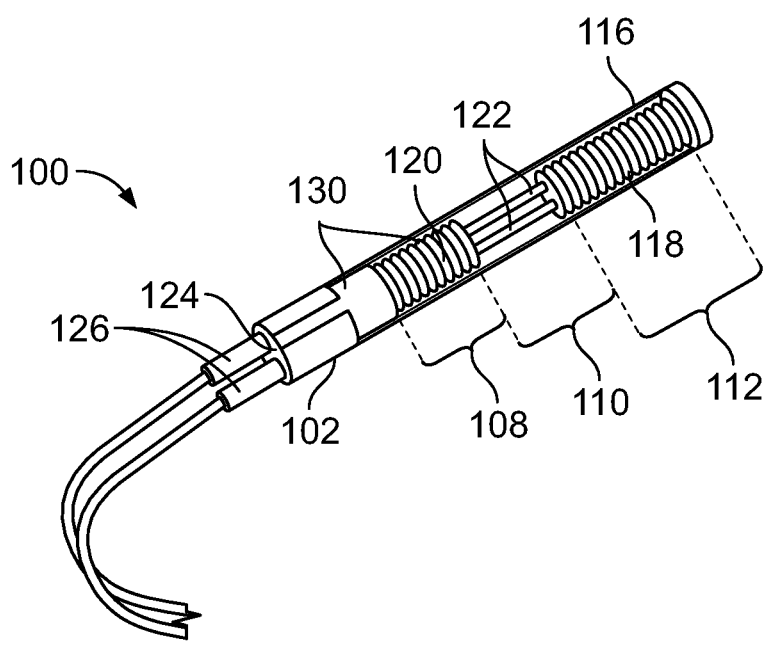
FIG. 3 is a diagrammatic representation of an internal perspective view of a cartridge heater, according to an embodiment of the present disclosure.

FIG. 3 is a diagrammatic representation of an internal perspective view of a cartridge heater 100, according to an embodiment of the present disclosure. The cartridge heater 100 may include a sheath 116 that covers resistance wire 118 at the distal end 112, resistance wire 120 at the proximal end 108, and conductor pins 122 within the intermediate portion 110. An end piece 124 may cover the proximal end 108. Lead wires 126 extend outwardly from the end piece 124.

The resistance wire 118 and 120 may be formed of nickel-chromium, which ensures even and efficient of distribution of heat to the sheath 116. The conductor pins 122 provide a metallurgical bond to the resistance wire 118 and 120, thereby ensuring an efficient electrical connection. The cartridge heater 100 may also include insulation 130, such as magnesium oxide insulation, which provides increased dielectric strength and promotes efficient heating.

It is to be understood that the cartridge heater 100 as shown and described with respect to FIGS. 2 and 3 may include more or less components than shown. The cartridge heaters 100 shown and described are merely exemplary, and may include different shapes and sizes than shown.

Figure 4:
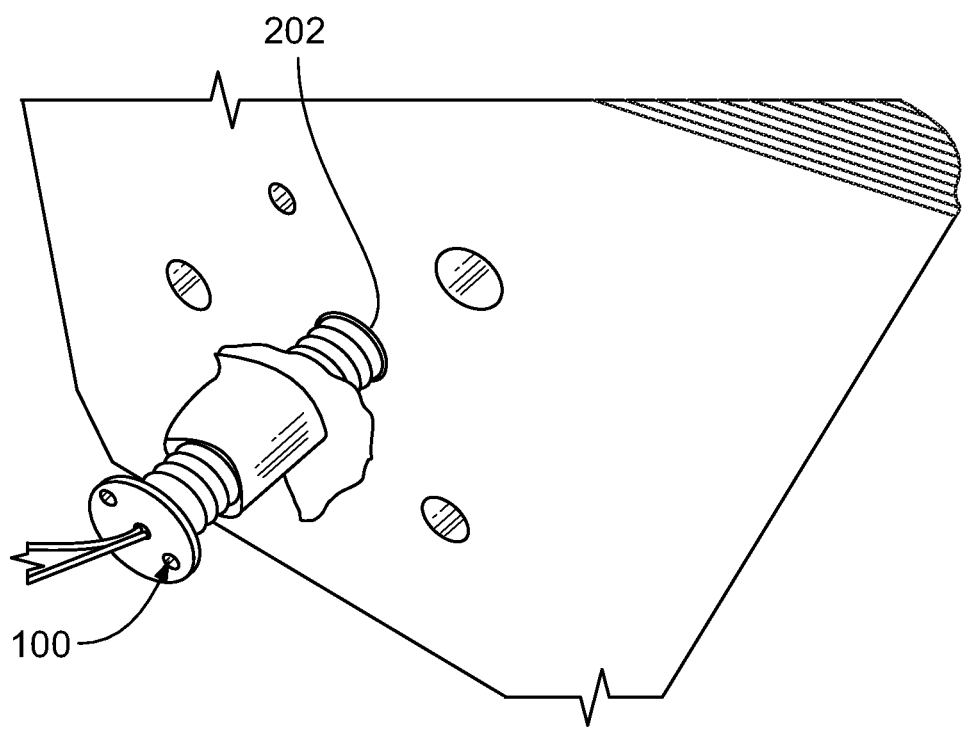
FIG. 4 is a diagrammatic representation of a front perspective view of a cartridge heater inserted into a through-hole of a structure, according to an embodiment of the present disclosure.

FIG. 4 is a diagrammatic representation of a front perspective view of the cartridge heater 100 inserted into a through-hole 202 of a structure 204, according to an embodiment of the present disclosure. The structure 204 may be or include one or more layers of composite material. For example, the structure 204 may be formed entirely of a composite material. In at least one other embodiment, the structure 204 includes one or more layers of composite material, and one or more metal structures therein.

Figure 5:
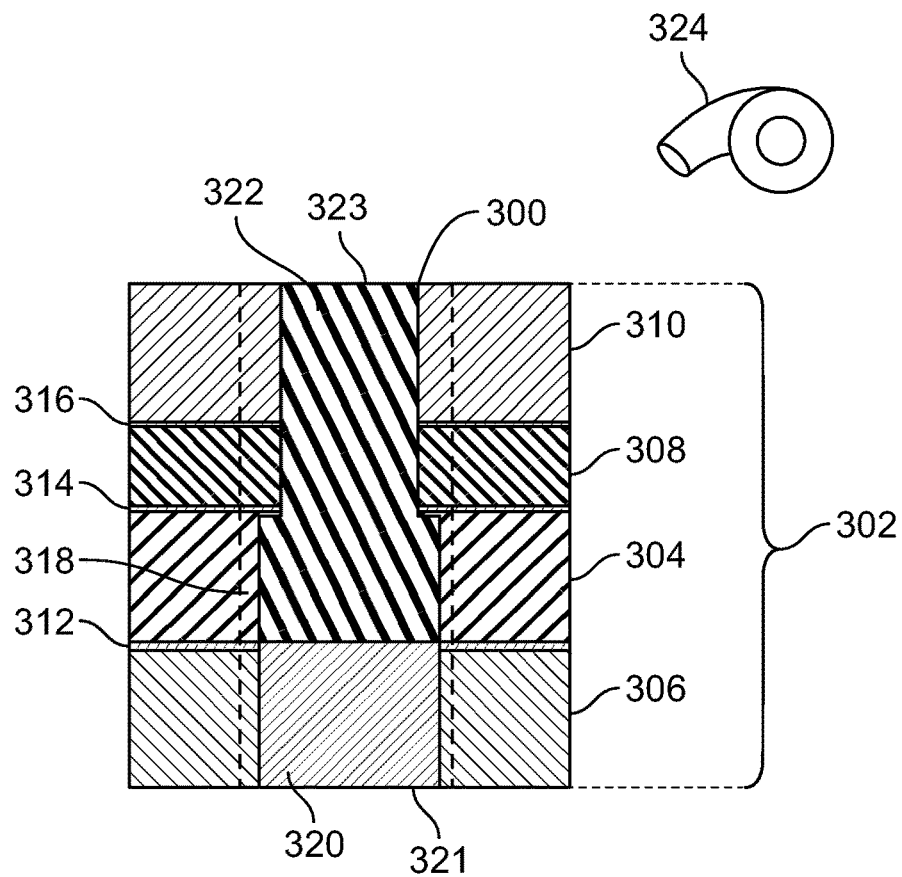
FIG. 5 is a diagrammatic representation of an axial cross-sectional view of a through-hole formed through a structure, according to an embodiment of the present disclosure.

FIG. 5 is a diagrammatic representation of an axial cross-sectional view of a through-hole 300 formed through a structure 302, according to an embodiment of the present disclosure. The structure 302 may be a stack-up of components and/or materials that includes a composite structure 304 (such as may form a rear spar within a portion of an aircraft), a fitting 306 (such as a metal drag brace fitting) proximate to (such as underneath, above, next to, or the like) the composite structure 304, a metal terminal fitting 308 proximate to the composite structure 304, and a fitting 310 (such as a metal Hoover fitting) above the terminal fitting 308. Shims 312, 314, and 316 may be positioned between the components of the structure 302. The through-hole 300 extends through each portion of the structure 302.

The structure 302 may include more or less layers than shown. In at least one embodiment, the structure 302 may include only one or more layers of the composite structure 304. As another example, the structure 302 may include a carbon fiber composite structure 304 between first and second layers, which may be formed of metal (such as aluminum).

Internal edges 318 of composite structure 304 that define a portion of the through-hole 300 may need to be repaired. In order to repair the internal edges 318, a plug 320 (such as formed of Teflon) may first be positioned within the through-hole 300 and, specifically, within the fitting 306. In particular, the plug 320 is inserted into a first end 321 of the through-hole 300. Potting compound 322 (such as Epocast 1635 A/B potting compound) is then filled into the through-hole 300 opposite from the plug 320, such as through an opposite second end 323 of the through-hole 300.

After the potting compound 322 is inserted into the through-hole 300, a hot air blower 324 is then used to provide an initial cure of the potting compound 322. Optionally, instead of (or in addition to) the hot air blower 324, a curing oven, heater, or the like may be used. For example, the hot air blower 324 may blow hot air at a temperature of approximately 150 degrees F. over the structure 302. The initial cure via the hot air blower 324 sets the potting compound 322 within the through-hole 300.

Figure 6:
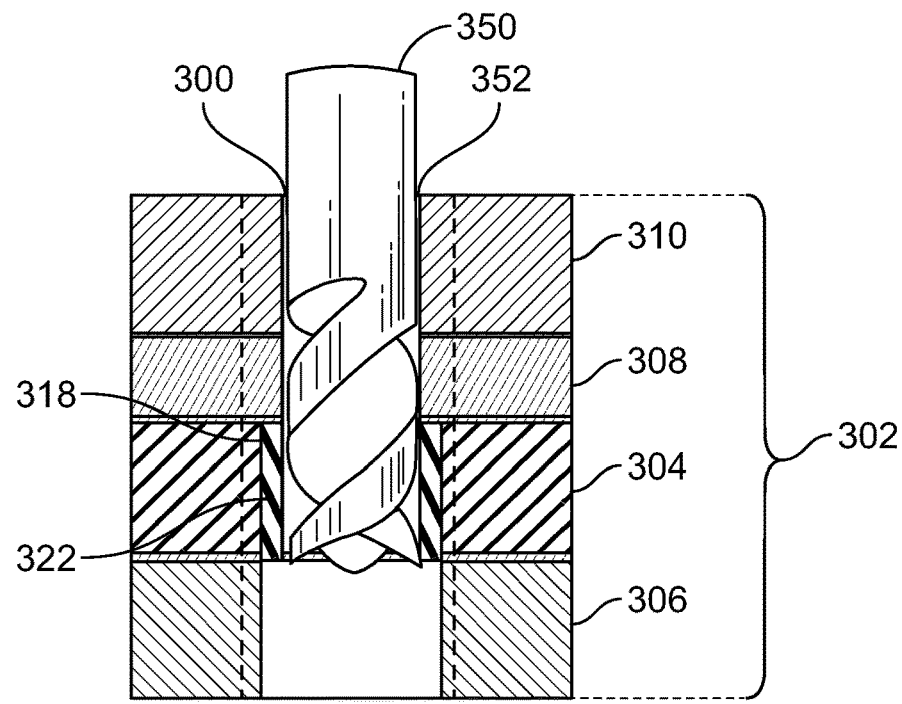
FIG. 6 is a diagrammatic representation of an axial cross-sectional view of a through-hole having a drill bit therein, according to an embodiment of the present disclosure.

FIG. 6 is a diagrammatic representation of an axial cross-sectional view of the through-hole 300 having a drill bit 350 therein, according to an embodiment of the present disclosure. After the potting compound 322 has been set by the initial curing via the hot air blower 324, the drill bit 350 is used to drill a hole 352 through the potting compound 322. The hole 352 may be slightly undersized, and configured to allow the shaft 102 of the cartridge heater 100 (shown in FIGS. 2 and 3) to pass therein. The hole 352 is sized so that the potting compound 322 remains secured to the internal edges 318 of the composite structure 304 that defines the portion of the through-hole 300 extending through the composite structure 304.

Figure 7:
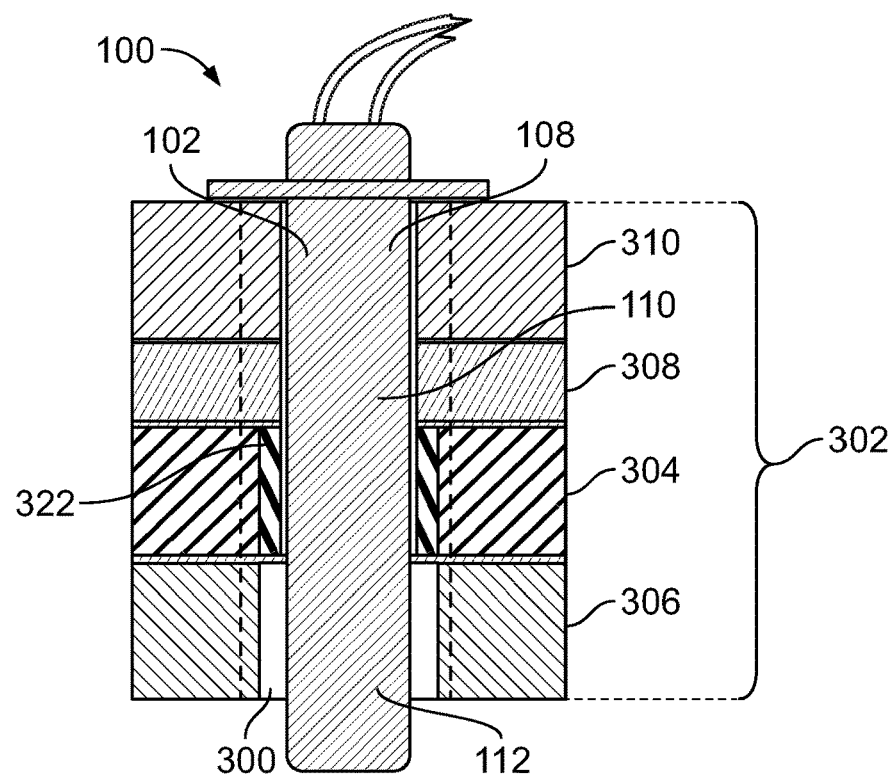
FIG. 7 is a diagrammatic representation of an axial cross-sectional view of a through-hole having a shaft of a cartridge heater therein, according to an embodiment of the present disclosure.

FIG. 7 is a diagrammatic representation of an axial cross-sectional view of the through-hole 300 having the shaft 102 of the cartridge heater 100 therein, according to an embodiment of the present disclosure. The intermediate portion 110 of the cartridge heater 100 is positioned within the portion of the through-hole 300 that extends through the composite structure 304. Because the watt density of the cartridge heater 100 is higher at the intermediate portion 110 than at the proximal end 108 and the distal end 112, heat energy generated by the cartridge heater 100 is concentrated within the composite structure 304, while the lower heat energy generated at the proximal end 108 and the distal end 112 reduces heat energy at the proximal end 108 and the distal end 112. Further, the lower heat energy at the proximal end 108 and the distal end 112 ensures that other portions of the structure 302 are not overheated. Instead, the heat energy is generally concentrated at the portion of the through-hole 300 extending through the composite structure 304, thereby providing a final curing of the potting compound 322 within the composite structure 304 to provide an efficient and easy repair without the need for heat blankets or a disassembly of the structure 302. Alternatively, heat blankets may be used, and/or the structure 302 may be disassembled.

After the final cure, the cartridge heater 100 is removed from the through-hole 300. A full-size hole may then be drilled through the fully-cured potting compound 322 within the composite structure 304. In at least one embodiment, the shaft 102 of the cartridge heater 100 may be coated with a release agent, such as FREKOTE, before insertion into the through-hole 300, to facilitate ease of removal of the cartridge heater 100 from the through-hole after the final curing.

Figure 8:
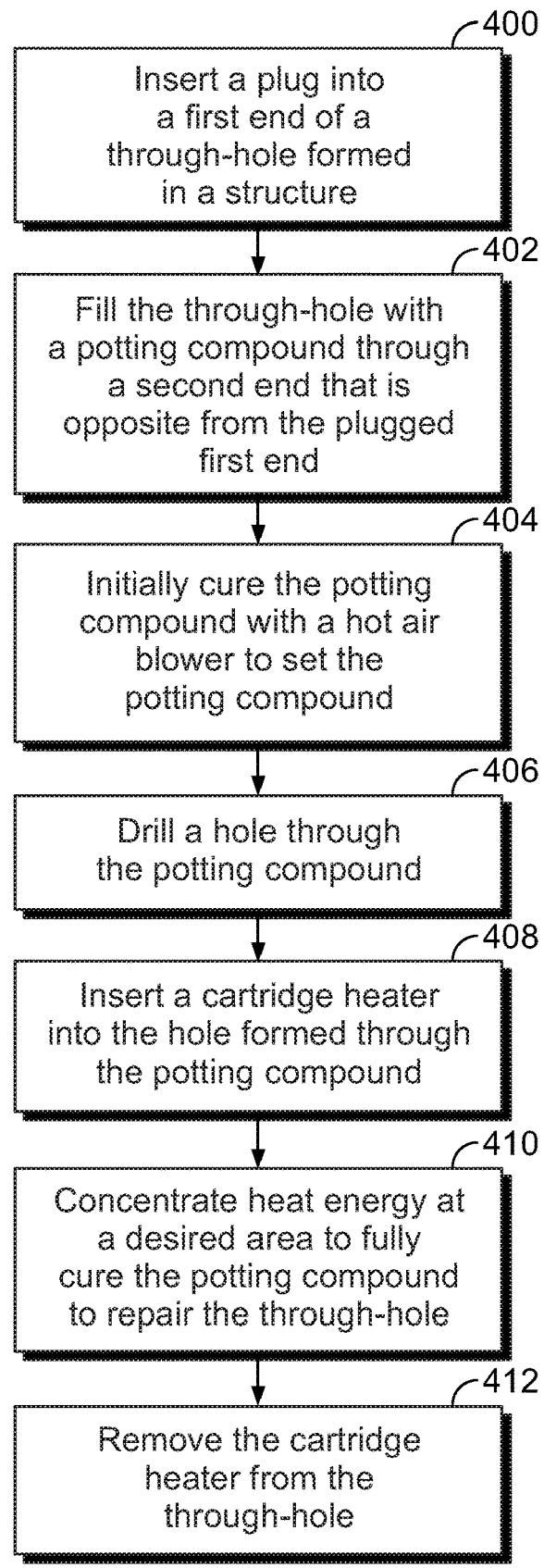
FIG. 8 is a flow chart of a method for repairing a through-hole formed through a structure, according to an embodiment of the present disclosure.

FIG. 8 is a flow chart of a method for repairing a through-hole formed through a structure, according to an embodiment of the present disclosure. Referring to FIGS. 5-8, the method begins at 400, at which the plug 320 is inserted into the first end 321 of the through-hole 300 formed in the structure 302. Next, at 402, the through-hole 300 is filled with the potting compound 322 through the second end 323 that is opposite from the plugged first end 321.

At 404, the potting compound 322 is initially heated or cured, such as with the hot air blower 324 to set the potting compound 322 within the through-hole 300. After the potting compound 322 is set, the plug 320 may be removed.

At 406, after the potting compound is set, the hole 352 is drilled through the potting compound 322. Then, at 408, the cartridge heater 100 is inserted into the hole 352 formed through the potting compound 322. At 410, heat energy is concentrated at or otherwise directed into or onto a desired area (such as within the composite structure 304) to fully cure the potting compound 322 to repair the through-hole 300. For example, the heat energy may be concentrated at the intermediate portion 110 between the proximal end 108 and the distal end 112 of the shaft 102. At 412, after a predetermined time for curing (and/or after a sensor detects a sufficient curing temperature, for example), the cartridge heater 100 is removed from the through-hole 300.

Figure 9:
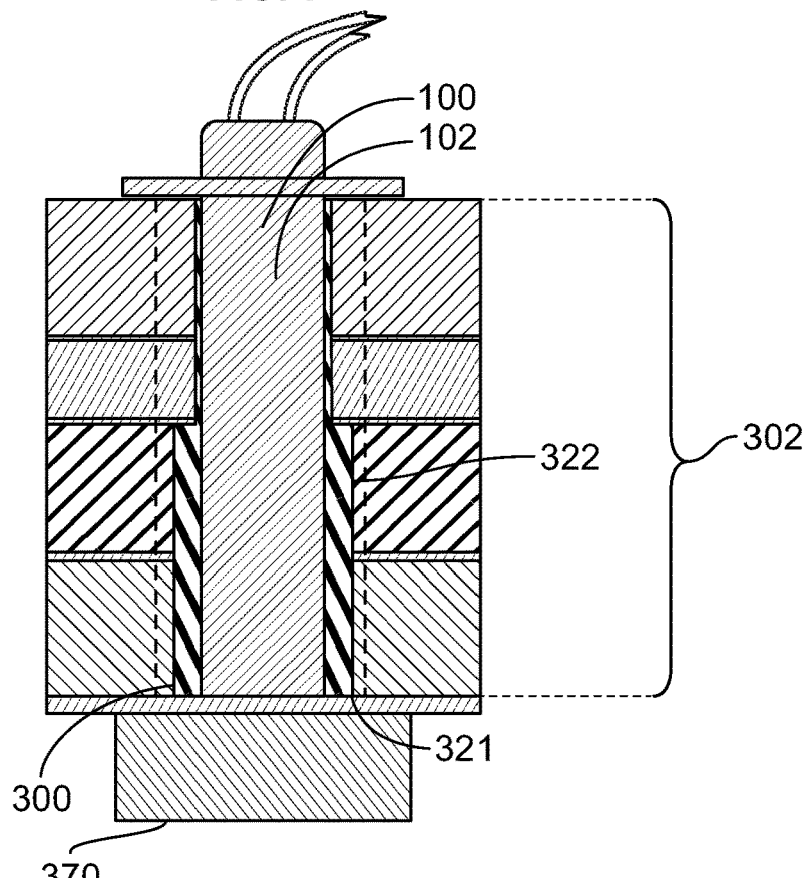
FIG. 9 is a diagrammatic representation of an axial cross-sectional view of a through-hole having a shaft of a cartridge heater therein, according to an embodiment of the present disclosure.

FIG. 9 is a diagrammatic representation of an axial cross-sectional view of a through-hole 300 having a shaft of a cartridge heater 100 therein, according to an embodiment of the present disclosure. In this embodiment, insulation 370 may be positioned over the end 321 of the through-hole 300. Potting compound 322 may then be used to fill the through-hole 300. Optionally, the end 321 may be plugged, as shown and described with respect to FIG. 5.

Before the potting compound 322 sets, the shaft 102 of the cartridge heater 100 is inserted into the potting compound 322 within the through-hole 300. As shown, the shaft 102 may extend through all layers of the structure 302. In at least one other embodiment, the shaft 102 may be inserted into the through-hole 300 before the potting compound 322. The potting compound 322 may then be filled into the through-hole 300 around the shaft 102. For example, the potting compound may fill in areas between the shaft 102 and the structure 302.

The cartridge heater 100 is then activated to provide curing heat to the potting compound 322, as described herein. The cartridge heater 100 may be coated with a release agent, such as FREKOTE, which facilitates easy removal of the cartridge heater 100 from the fully cured potting compound 322. After the curing step and removal of the cartridge heater 100, a full sized hole may be (although not necessarily) drilled through the potting compound 322.

Figure 10:
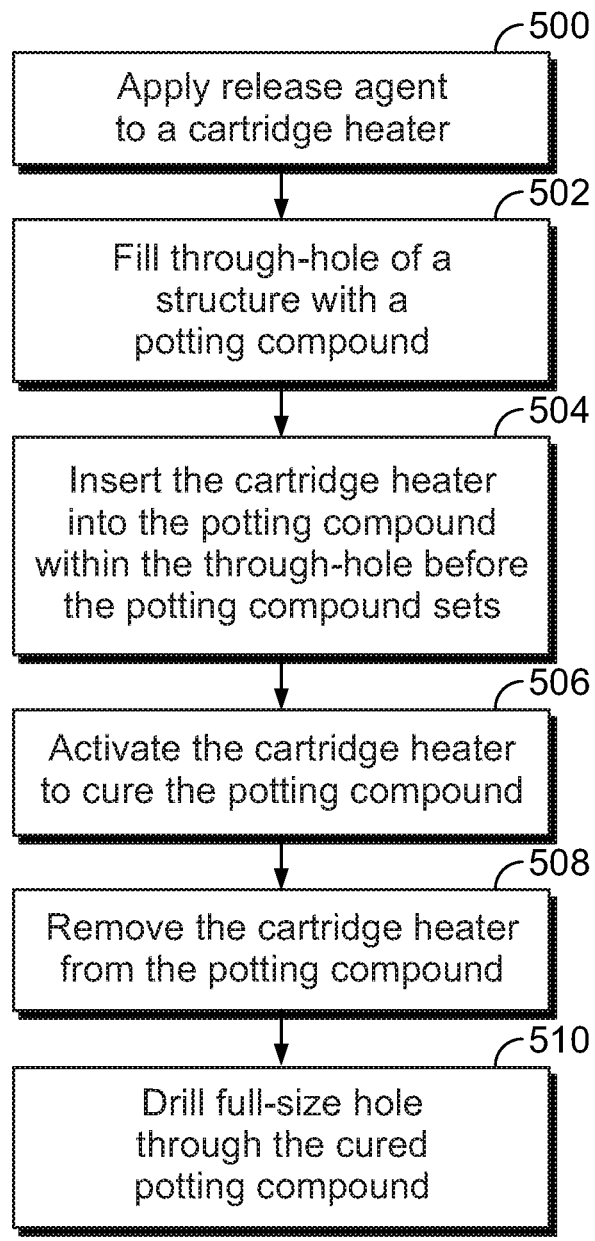
FIG. 10 is a flow chart of a method for repairing a through-hole formed through a structure, according to an embodiment of the present disclosure.

FIG. 10 is a flow chart of a method for repairing a through-hole formed through a structure, according to an embodiment of the present disclosure. Referring to FIGS. 9 and 10, the method begins at 500, at which a release agent is optionally applied to the shaft 102 of the cartridge heater 100.

At 502, the through-hole 300 of the structure 302 is filled with the potting compound 322. At 504, the shaft 102 of the cartridge heater 100 is inserted into the potting compound 322 within the through-hole 300 before the potting compound 322 sets. Optionally, the shaft 102 of the cartridge heater 100 may first be positioned within the through-hole 300, and the potting compound 322 may be filled into the through-hole 300 around the shaft 102.

At 506, the cartridge heater 100 is activated to cure the potting compound 322. After a predetermined period of time and/or sensed condition for curing, the cartridge heater 100 is removed from the potting compound 508. The release agent facilitates ease of removal of the cartridge heater 100 from the cured potting compound 322. After the potting compound 322 has been cured, and the cartridge heater 100 removed therefrom, a full-size hole may be (although not necessarily) drilled through the cured potting compound 322 at 510.

Referring to FIGS. 2-10, cartridge heaters 100 of different shapes and sizes may be used depending on the size of the through-hole 300. It has been found that larger diameter cartridge shafts may be more efficient. For example, a shaft 102 having a diameter 114 of 0.75 inches set to a temperature of 217 degrees F. generates a temperature of 196-205 degrees F. at a hole edge. A shaft 102 having a diameter 114 of 0.50 inches set to a temperature of 269-274 degrees F. generates a temperature of 199-205 degrees F. at a hole edge. A shaft 102 having a diameter 114 of 0.25 inches set to a temperature of 450-500 degrees F. generates a temperature of 200-220 degrees F. at a hole edge.

Embodiments of the present disclosure provide a method of repairing a through-hole formed in a structure having at least one composite material. The method includes filling at least a portion of the through-hole with a potting compound, inserting a portion of a cartridge heater into the through-hole, and curing the potting compound with the cartridge heater.

As described herein, embodiments of the present disclosure provide efficient methods of repairing a composite material, such as within a layup that forms a portion of a component.

While various spatial and directional terms, such as top, bottom, lower, mid, lateral, horizontal, vertical, front and the like may be used to describe embodiments of the present disclosure, it is understood that such terms are merely used with respect to the orientations shown in the drawings. The orientations may be inverted, rotated, or otherwise changed, such that an upper portion is a lower portion, and vice versa, horizontal becomes vertical, and the like.

As used herein, a structure, limitation, or element that is "configured to" perform a task or operation is particularly structurally formed, constructed, or adapted in a manner corresponding to the task or operation. For purposes of clarity and the avoidance of doubt, an object that is merely capable of being modified to perform the task or operation is not "configured to" perform the task or operation as used herein.

It is to be understood that the above description is intended to be illustrative, and not restrictive. For example, the above-described embodiments (and/or aspects thereof) may be used in combination with each other. In addition, many modifications may be made to adapt a particular situation or material to the teachings of the various embodiments of the disclosure without departing from their scope. While the dimensions and types of materials described herein are intended to define the parameters of the various embodiments of the disclosure, the embodiments are by no means limiting and are exemplary embodiments. Many other embodiments will be apparent to those of skill in the art upon reviewing the above description. The scope of the various embodiments of the disclosure should, therefore, be determined with reference to the appended claims, along with the full scope of equivalents to which such claims are entitled. In the appended claims, the terms "including" and "in which" are used as the plain-English equivalents of the respective terms "comprising" and "wherein." Moreover, the terms "first," "second," and "third," etc. are used merely as labels, and are not intended to impose numerical requirements on their objects. Further, the limitations of the following claims are not written in means-plus-function format and are not intended to be interpreted based on 35 U.S.C. § 112(f), unless and until such claim limitations expressly use the phrase "means for" followed by a statement of function void of further structure.

This written description uses examples to disclose the various embodiments of the disclosure, including the best mode, and also to enable any person skilled in the art to practice the various embodiments of the disclosure, including making and using any devices or systems and performing any incorporated methods. The patentable scope of the various embodiments of the disclosure is defined by the claims, and may include other examples that occur to those skilled in the art. Such other examples are intended to be within the scope of the claims if the examples have structural elements that do not differ from the literal language of the claims, or if the examples include equivalent structural elements with insubstantial differences from the literal language of the claims.

What is claimed is:

1. A method of repairing a through-hole formed in a structure having at least one composite material, the method comprising: filling at least a portion of the through-hole with a potting compound; initially heating the potting compound to set the potting compound within the through-hole; drilling a hole through the potting compound that is set within the through-hole; inserting a portion of a cartridge heater into the through-hole, wherein the inserting comprises inserting a shaft of the cartridge heater into the hole through the potting compound; and curing the potting compound with the cartridge heater.

2. The method of claim 1, further comprising plugging a first end of the through-hole, wherein the filling occurs after the plugging.

3. The method of claim 1, wherein the curing comprises concentrating heat energy within an intermediate portion of a shaft of the cartridge heater, wherein the intermediate portion is between a proximal end and a distal end of the shaft.

4. The method of claim 3, wherein the concentrating further comprises generating lesser amounts of heat energy at the proximal end and the distal end than at the intermediate portion.

5. The method of claim 1, further comprising removing the portion of the cartridge heater from the through-hole after the curing.

6. The method of claim 1, further comprising drilling a full-size hole through the potting compound within the through-hole of the structure after the curing.

7. The method of claim 1, further comprising applying a release agent to the portion of the cartridge heater before the inserting.

8. The method of claim 1, wherein the filling occurs before the inserting.

9. The method of claim 1, wherein the filling occurs after the inserting.

10. The method of claim 1, wherein the inserting comprises inserting the portion of the cartridge heater into the potting compound within the through-hole before the potting compound sets.

11. A method of repairing a through-hole formed in a structure having at least one composite material, the method comprising:
  filling at least a portion of the through-hole with a potting compound;
  initially heating the potting compound to set the potting compound within the through-hole;
  drilling a hole through the potting compund that is set within the through-hole;
  inserting a portion of a cartridge heater into the through-hole, wherein the inserting comprises inserting a shaft of the cartridge heater in the hole through the potting compound;
  curing the potting compound with the cartridge heater, wherein the curing comprises concentrating heat energy within an intermediate portion of a shaft of the cartridge heater, wherein the intermediate portion is between a proximal end and a distal end of the shaft, wherein the concentrating heat energy comprises generating lesser amounts of heat energy at the proximal end and the distal end than at the intermediate portion;
  removing the portion of the cartridge heater from the through-hole after the curing; and
  drilling a full-size hole through the potting compound within the through-hole of the structure after the curing and the removing.

12. The method of claim 11, further comprising plugging a first end of the through-hole, wherein the filling occurs after the plugging.

13. The method of claim 11, further comprising applying a release agent to the portion of the cartridge heater before the inserting.

14. The method of claim 11, wherein the filling occurs before the inserting.

15. The method of claim 11, wherein the filling occurs after the inserting.

16. The method of claim 11, wherein the inserting comprises inserting the portion of the cartridge heater into the potting compound within the through-hole before the potting compound sets.

17. A method of repairing a through-hole formed in a structure having at least one composite material, the method comprising:

plugging a first end of the through-hole;
filling at least a portion of the through-hole with a potting compound, wherein the filling occurs after the plugging;
initially heating the potting compound to set the potting compound within the through-hole;
drilling a hole through the potting compound that is set within the through-hole;
applying a release agent to a portion of a cartridge heater;
inserting the portion of the cartridge heater into the through-hole, wherein the inserting comprises inserting a shaft of the cartridge heater in the hole through the potting compound;
curing the potting compound with the cartridge heater, wherein the curing comprises concentrating heat energy within an intermediate portion of a shaft of the cartridge heater, wherein the intermediate portion is between a proximal end and a distal end of the shaft;
removing the portion of the cartridge heater from the through-hole after the curing; and
drilling a full-size hole through the potting compound within the through-hole of the structure after the curing.

18. The method of claim 17, wherein the concentrating further comprises generating lesser amounts of heat energy at the proximal end and the distal end than at the intermediate portion.

19. The method of claim 17, wherein the applying the release agent occurs before the inserting.

20. The method of claim 17, wherein the filling occurs before the inserting.

* * * * *